March 10, 1970

S. KOTTLE ET AL 3,499,712

REFRACTIVE INDEX ANALYZER USING SEVERAL
LIQUID-SOLID INTERFACES
Filed Feb. 27, 1968

INVENTORS.
Sherman Kottle
BY Bert O. Day

Griswold & Burdick
ATTORNEYS

United States Patent Office 3,499,712
Patented Mar. 10, 1970

3,499,712
REFRACTIVE INDEX ANALYZER USING SEVERAL
LIQUID-SOLID INTERFACES
Sherman Kottle and Bert O. Day, Lake Jackson, Tex.,
assignors to The Dow Chemical Company, Midland,
Mich., a corporation of Delaware
Filed Feb. 27, 1968, Ser. No. 708,678
Int. Cl. G01n 21/46, 21/22
U.S. Cl. 356—128                                         7 Claims

ABSTRACT OF THE DISCLOSURE

The present invention relates to an apparatus and method for analyzing liquids, particularly useful in measuring refractive index of liquids or mixtures of liquids, comprising a light radiation source, a photodetector and a sample liquid holder interposed therebetween having a transparent reservoir for the liquid being analyzed which contains a transparent structure which provides at least several liquid-solid interfaces when liquid is placed in the reservoir.

BACKGROUND OF THE INVENTION

Field of the invention

The present invention relates to an optical liquid analyzer and more specifically a refractive index analyzer consisting of a light radiation source, photodetector and sample liquid holder; said cell having a transparent reservoir for the liquid containing a transparent structure which provides at least several liquid-solid interfaces.

Prior art

Many conventional instruments used in the qualitative analysis of liquids are expensive to produce and require relatively complex components and equipment. For example, refractometers, which measure the angle of refraction of a light beam to determine the index of refraction of liquids, require expensive precision-made prisms and measuring instruments. Furthermore, some analysis systems will not operate with small, e.g., 0.01 cc., liquid samples.

A primary object of the present invention is to provide a relatively simple and inexpensive apparatus for analyzing liquids.

Another object of the present invention is to provide a relatively simple and inexpensive apparatus and method for measuring refractive index of liquids.

Still another object of the present invention is to provide a liquid qualitative or quantitative analysis system useful in analyzing minute volumes of liquids.

A further object of the present invention is to provide a novel sample holder to be used in an optical analysis system.

THE INVENTION

The above and other objects and advantages will be more fully understood from the following description of the invention considered in connection with the accompanying drawings which are to be considered as illustrative of the invention and not in limitation thereof.

Figure 1:
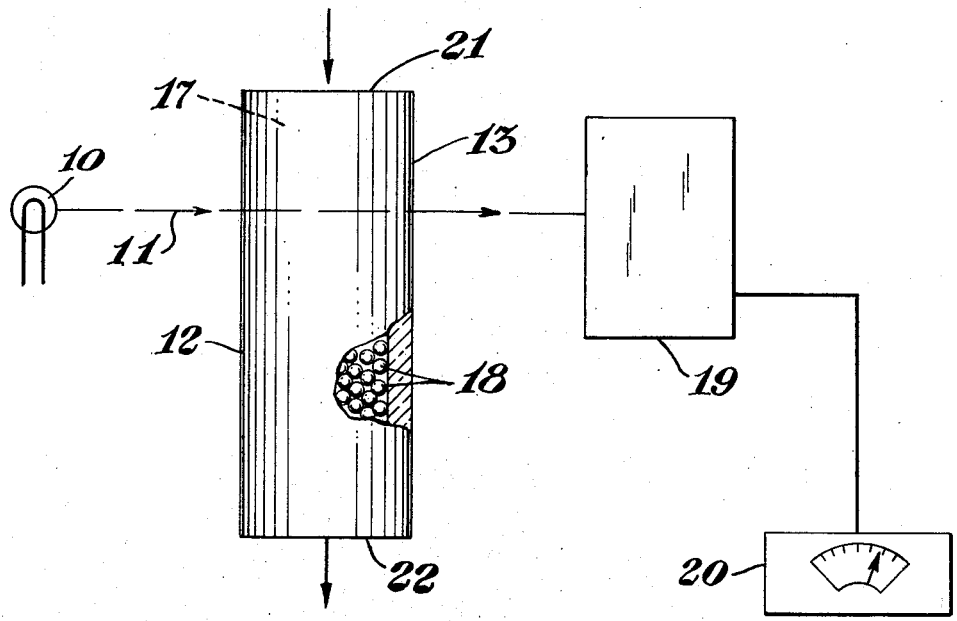
FIG. 1 is a diagrammatic view of one embodiment of an apparatus of the present invention wherein a portion of the vertical cross-section of the detecting cell has been cut away.

Referring to FIG. 1 in detail, the apparatus comprises a light radiation source 10, a photodetector 19 and a sample holder 13 interposed between said source and photodetector.

The light radiation source 10 may be any source of visible light, infrared and ultraviolet radiation.

The sample holder 13 is made of suitable material which is transparent to the type of light source 10 used. For example, if visible light radiation, i.e., from about 4000 A. to about 7000 A. wavelength, is employed, the holder 13 could be made of glass; if infrared light radiation, i.e., from about 7000 A. to about $1 \times 10^7$ A. wavelength, is used, rock salt, silver chloride and germanium are suitable holder 13 materials; if ultraviolet radiation, i.e., from about 100 A. to about 4000 A. wavelength, is used, the holder 13 could be made of quartz. The holder 13 may be cylindrical, rectangular or similar shape consistent with the requirement that it be transparent to the radiation of the light source 10 used.

The sample holder 13 contains a means 21 for permitting the liquid to enter the holder and exiting means 22 for the liquid. Although the holder is depicted in this embodiment of the present invention in FIG. 1 as a flow cell, the present invention may be employed using a static, i.e., single opening for liquid entry and exit, sample holder.

The holder 13 also contains a liquid reservoir 17 therein which is packed with a structure or packing 18 which is of a material transparent to the light source being used and which provides at least several liquid-solid interfaces when the liquid is in contact with the packed material 18. Examples of structure or packing 18 include spherical, cubic or cylindrical particles and fibrous or sintered materials. The more closely packed the structure, the less liquid is necessary to obtain a measurement and the more sensitive the instrument.

The term packing as used herein with respect to the material positioned in the reservoir of the holder includes both integral units wherein particles are bound together to form a unitized structure as well as loosely or firmly packed masses of particlate materials.

The photodetector 19 may be any instrument capable of detecting the source of light radiation used, such as a barrier layer photocell or a photoresistor. The photodetector may contain or be connected to the means of measuring the light such as a dial indicator or recorder 20.

In the use of the apparatus the radiation beam 11 from the light radiation source 10 enters the transparent front wall 12 of the sample holder 13 but is essentially blocked by the packed materials 18 through absorption, refraction and reflection before the liquid to be analyzed is placed in the holder 13. Therefore, the photodetector sees little or no light coming through the sample holder. However, when the liquid is added to the holder 13 through entrance 21, the liquid-packed material interfaces allow a portion of the radiation beam 11 to pass through to the photodetector 19. The radiation intensity measured by the photodetector 19 and recorder 20 is directly proportional to the liquid's index of refraction. The recorder 20 or other indicator device connected to the photodetector may be calibrated in terms of refractive index using samples of known liquids. Thus the apparatus can be used to measure unkown indices of refraction.

As previously stated refractometers heretofore have measured indices of refraction by angular deflection of light beams requiring expensive, precision equipment. The apparatus of the present invention, on the other hand, determines indices of refraction by light intensity measurements. This apparatus is relatively simple to construct and requires relatively inexpensive equipment while maintaining similar sensitivity to the conventional complex expensive analyzing systems. The apparatus is particularly useful for analysis of minute samples, e.g., 0.01 cc., of liquids.

Figure 2:
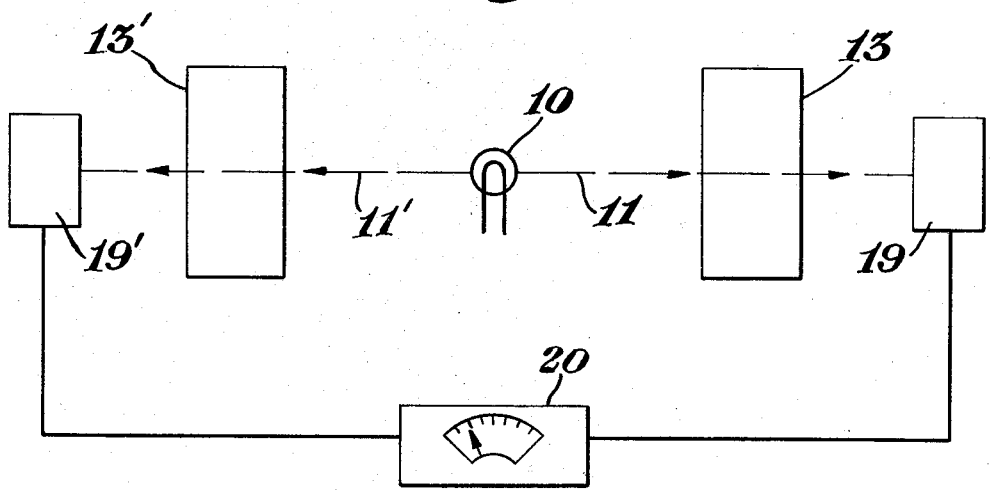
FIG. 2 is a diagrammatic view of a second embodiment of the apparatus of the present invention.

In FIG. 2, another embodiment of the present invention, the apparatus comprises a light radiation source 10, two photodetecting cells 19 and 19' and two sample holders 13 and 13', in the flow cell form, each interposed between the light source 10 and one of the photodetectors 19 and 19'. The photodetectors are attached to a recorder 20 or some other indicating means.

This embodiment of the present invention uses the apparatus as a differential measuring device. The light radiation source 10 emits radiation beams 11 and 11' which pass through sample holders 13 and 13'. The photodetectors 19 and 19' measure the respective radiation intensities. The recorder 20 is calibrated to indicate a predetermined value when the liquids passing through detecting cells 19 and 19' are the same, i.e., their indices of refraction are equal. When one of the liquids changes composition, this is reflected in a change in refractive index and the light intensity seen by the respective photodetector which is in turn indicated by the recorder 20. The apparatus of the present invention can thus be effectively used as a liquid quality control device.

What is claimed is:

1. An optical liquid analyzing apparatus comprising a light radiation source, photodetector and a sample holder interposed therebetween; said sample holder having a light radiation passageway through a liquid reservoir which contains a packing which provides at least several liquid-solid interfaces therein; materials of construction in said passageway and reservoir including the packing being substantially transparent to the light radiation from said radiation source.

2. The apparatus as defined in claim 1 wherein the radiation source provides visible light radiation and material of construction in the passageway and reservoir including the packing is glass.

3. The apparatus as defined in claim 1 wherein the radiation source provides ultraviolet radiation and material of construction in the passageway and reservoir including the packing is quartz.

4. The apparatus as defined in claim 1 wherein the radiation source provides infrared radiation and material of construction in the passageway and reservoir including the packing is selected from the group consisting of rock salt, silver chloride and germanium.

5. The apparatus as defined in claim 1 wherein the radiation source provides visible light radiation, the material of construction in the passageway and reservoir is glass, and the packing in the reservoir of said holder is made of a material other than glass but transparent to said visible radiation.

6. A sample holder for use in an analyzing apparatus employing a light radiation source as a means of energy; said holder having a light radiation passageway through a liquid reservoir which contains a packing which provides at least several solid-liquid interfaces therein; materials of construction in said passageway and reservoir including the packing being transparent to the light radiation from said radiation source.

7. A method of measuring the refractive index of liquids which comprises: providing a light radiation source; providing a liquid sample to be analyzed; placing said sample in a sample holder having a light radiation passageway through a liquid reservoir which contains a packing which provides at least several liquid-solid interfaces therein, materials of construction in said passageway and liquid reservoir including the packing in the reservoir being transparent to the radiation of said radiation source; passing the radiation from said light radiation source through the reservoir of said sample holder; measuring the intensity of the radiation exiting from said sample holder; and converting the intensity measurement to the corresponding index of refraction of said liquid sample.

References Cited

UNITED STATES PATENTS

| | | | |
|---|---|---|---|
| 2,228,064 | 1/1941 | Runge et al. | 250—218 X |
| 2,569,127 | 8/1951 | Eltenton | 250—218 X |
| 2,857,803 | 10/1958 | Reinecke et al. | |
| 3,386,332 | 6/1968 | Watson. | |

FOREIGN PATENTS

| | | |
|---|---|---|
| 1,026,078 | 4/1966 | Great Britain. |

RALPH G. NILSON, Primary Examiner

C. M. LEEDOM, Assistant Examiner

U.S. Cl. X.R.

250—218; 356—201